March 27, 1945.    G. P. BEVAN    2,372,172
ROTARY PLOW
Filed May 19, 1942

Inventor
G. P. Bevan
By Gareth C. Maybee
ATTY.

Patented Mar. 27, 1945

2,372,172

UNITED STATES PATENT OFFICE 2,372,172

ROTARY PLOW

Glen P. Bevan, Toronto, Ontario, Canada, assignor to Reo Motors, Inc., Lansing, Mich., a corporation of Michigan Application May 19, 1942, Serial No. 443,593

9 Claims. (Cl. 37—43)

This invention relates to rotary plows, and particularly to the type of plow used for removing snow from roads and fields.

Rotary plows for snow removal have come into quite extensive use, being superior in many ways and for many purposes to the ordinary push-type plow. However, rotary plows heretofore used have not been very efficient and are apt to clog or jam with snow, particularly if the snow is wet.

The object of this invention is to improve the efficiency of rotary plows and to avoid clogging or jamming of snow either in the plowing and conveying part of the plow or in the discharge part thereof.

I achieve the object of this invention by the construction which is hereinafter particularly described and illustrated, by way of example, in the accompanying drawing, in which Figure 1 is a plan view;

In the drawing corresponding numerals in the different figures refer to corresponding parts.

Figure 1:
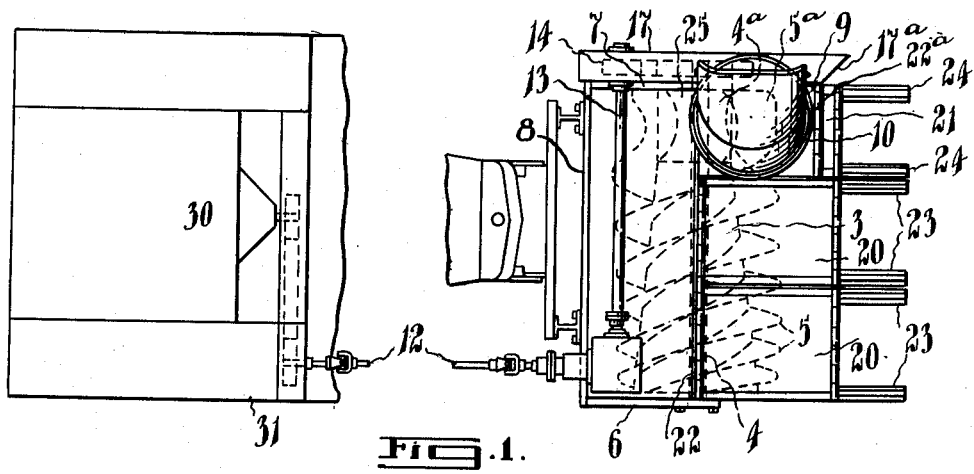
Figure 2:
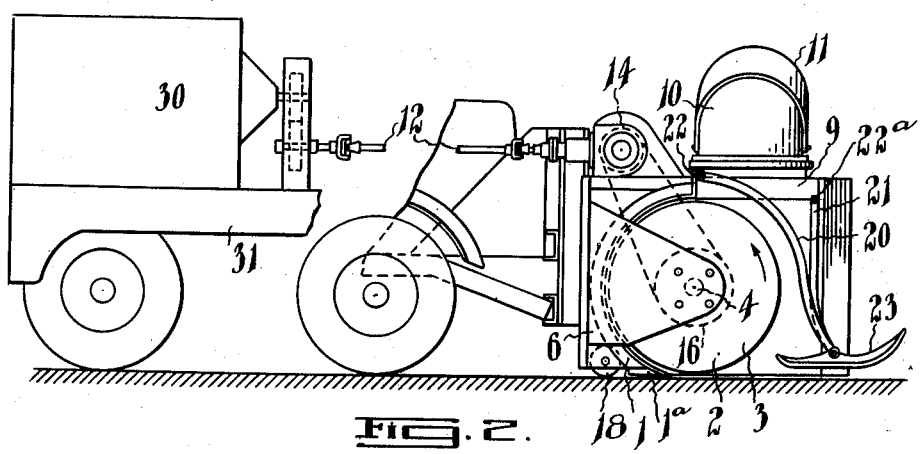
Figure 2 is a side elevation.

Details of the tractor or vehicle and the method of mounting the plow on the vehicle do not form part of this invention and will be mentioned only briefly.

The plow comprises a scoop 1 which extends transversely across the plow and forms a semi-cylindrical casing around substantially the rear half of the cutting and conveying member 2. The cutting and conveying member on sidewise movement thereof cuts into the snow or other material being plowed and conveys it longitudinally of the cutting and conveying member and transversely of the path of travel of the plow to a discharge means such as a centrifugal thrower.

The cutting and conveying member comprises a rotatable, tubular member 3 mounted on a shaft 4 and provided with helical cutting and conveying blades 5. The pitch angle of the helix formed by the blades 5 increases in the direction toward the discharge end of the cutting and conveying member. The rotatable member 3 is frusto-conical, tapering towards the discharge end of the cutting and conveying member, the peripheral diameter of the blades being substantially constant. Thus the size of the space between the helical blades increases towards the discharge end and provides accommodation for a greater quantity of the material being plowed and prevents the helical passage between the turns of the blades 5 from becoming clogged.

The discharge means or thrower is indicated generally at 25 and includes a rotatable member consisting of a shaft 4ª which is coaxial with the shaft 4 and preferably is a continuation of and integral with the said shaft 4. Extending radially from the shaft 4ª are impeller blades 5ª which are preferably continuous with the helical blades 5, the said helical blades merging into the impeller blades so that there is a continuous uninterrupted flow or travel of the material being plowed from the helical blades to the impeller blades.

The scoop 1 curves upwardly behind the helical blades 5 and the impeller blades 5ª forming a substantially semi-cylindrical casing to substantially the rear half of the said blades. End plates 6 and 7 secured to a vertically movable supporting member 8 are provided with bearings in which the shaft 4, 4ª rotates. Located adjacent the front substantially one half of the impeller blades is a casing 9 which with the adjacent portion of the scoop 1 and the end plate 7 forms a casing for the impeller blades. This casing together with the impeller blades forms the discharge means or thrower 25. The casing 9 extends downwardly in front of the plow to a point on a line with the top of the periphery of the impeller blades and has an open top forming a tangential discharge opening. Preferably a rotatable discharge chute 10 having an adjustable hood 11 is mounted over the said tangential discharge opening to direct the snow in the desired direction.

Driving means for rotating the rotatable cutting, conveying and discharge members is actuated by a motor 30 mounted on the traction vehicle 31 behind the cab thereof. A drive shaft 12 extends along one side of the said traction vehicle substantially horizontally and in a substantially straight line. A transverse shaft 13 operated by the drive shaft 12 by means of suitable gear mechanism at one end thereof is provided at its other end with a sprocket and chain drive 14, 15 and 16 for the shaft 4, 4ª. The sprocket and chain drive mechanism is located in a housing 17 the front edge 17ª of which is plow-shaped, being bevelled transversely towards the impeller blades so as to direct snow or other material inwardly towards the impeller blades, where it is picked up and discharged.

The lower edge of the scoop 1 may be provided with a suitable replaceable shoe 1ª, and wheels 18 may be provided at each side of the plow to support it while in operation.

It will be seen that a plow constructed as described above will cut into the material being plowed with an upward movement, lifting the material and carrying it to the impeller blades which lift the material and eject it directly through the discharge opening. This involves a minimum of friction loss, and a minimum danger of clogging with wet snow. The snow is kept in front of the plow until it reaches the discharge means. The open lower portion of the casing of the discharge means permits the material to be plowed to enter the discharge blades directly and to be discharged immediately through the discharge opening by centrifugal force. In plows of the type ordinarily used, the helical blades turn downwardly, when used on the front of the plow, which tends to compress the material downwardly against the ground and the scoop, when it must be raised by the conveyor and carried to the discharge means. Usually the discharge means is located behind the cutting and conveying means to which the material must be carried then again lifted and ejected through the discharge opening, involving a change of direction which is likely to cause clogging or jamming if the material is moist or adhesive. The two chief objections to hitherto used rotary snowplows have been the amount of power required to operate them and the difficulty of operating in wet snow. Both these disadvantages are overcome by the construction above described.

Figure 3:
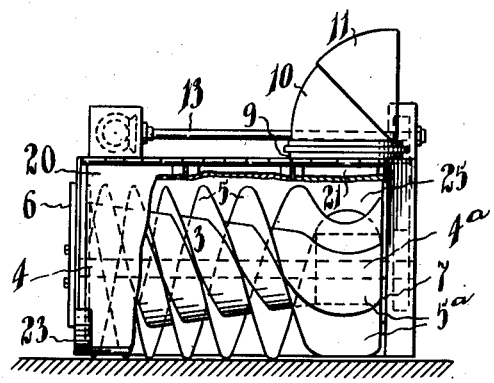
Figure 3 is a front elevation of my improved plow, partly broken away.

A further advantage of my plow as above described is the location of the power shaft along one side of the plow which makes it easy of access for oiling, greasing and maintenance. Since the source of power is a motor mounted on the pushing or tractor vehicle, this arrangement permits the power shaft to run in a straight line from the motor to the plow. In snowplows now commonly in use the drive shaft is carried under the vehicle necessitating several changes of direction involving great strain on the universal joints. The shaft is difficult to get at for servicing; is liable to damage by projections on the road or ground; and lifting clearance for the plow is limited. These objections are overcome by my construction. The advantage of running the power shaft down one side of the vehicle to a gear box and then across the front of the vehicle to transmission apparatus on the other side is that the load is balanced. The discharge is located on the left side of the plow (that is, the right side in Figure 3), which is normally the side adjacent the center line of a road when the plow is used for cleaning streets. A large proportion of rotary snowplow work is in cutting down banks along the shoulders of roads, where the snow has been thrown by a pusher type plow. In this construction the cutter blades can be run well over to the side of the road and the snow carried to the discharge means and discharged either into a truck or other suitable conveying vehicle or thrown off the road.

To prevent the material being plowed from being thrown forwardly and to act as a guard to prevent people or animals from being injured by the blades, a retractable guard or cover 20 is provided over and in front of the helical blades and a similar retractable cover 21 over and in front of the open front of the discharge casing.

The cover 20 is formed in two sections and is hingedly secured at 22 to the upper edge of the scoop 1 and is provided with a hinged runner or skid 23 at each end of its lower front edge. The skids 23 run along on the snow or other material being plowed and are automatically raised when the material is deep. The cover curves downwardly around the periphery of the helical blades then outwardly from the lower edge thereof. The cover 21 is similarly constructed and is hinged to the casing 9 at 22ᵃ and is provided with a runner or skid 24 at each lower corner thereof similar to the skids 23.

The cover 20 may be divided into any desired number of sections each section having a skid or runner or a plurality thereof, to provide for cases where the depth of the material being plowed varies, as for instance, when snow on the shoulder of a road is being plowed. In addition to the automatic means for raising the covers 20 and 21, suitable means (not shown) such as a cable running over a pulley may be provided for lifting the cover or covers by manual operation from the driver's seat of the vehicle, for cases where the material being plowed is deep and rises abruptly or where for any other reason it is desirable to manually raise the covers.

While the invention is described in some detail, it will be understood that this is by way of example only and applicant does not desire to be limited to the details of construction except as claimed in the appended claims.

What I claim as my invention is:

1. A snow-plow comprising a screw conveyor, means mounting said conveyor for rotation and for movement across the surface to be plowed sidewise of the conveyor, a housing extending around the rear side of the conveyor, a centrifugal thrower disposed at the discharge end of said conveyor, a casing for the thrower adapted to receive snow from the conveyor, a chute extending upwardly and laterally from said casing, and means for driving said conveyor and thrower so that they move upwardly on the forward side whereby the conveyor cuts into the snow by an upward movement and carries it to the thrower to be elevated through said chute.

2. A snow-plow comprising a screw conveyor, means mounting said conveyor for rotation and for movement across the surface to be plowed sidewise of the conveyor, a housing extending around the rear side of the conveyor, a centrifugal thrower disposed coaxially with and at one end of said conveyor, a casing for the thrower adapted to receive snow from the conveyor, a chute extending upwardly and laterally from said casing, and means for driving said conveyor and thrower, said conveyor including a frusto-conical body mounted for rotation about its longitudinal axis, and a helical blade extending around the body.

3. A snow-plow comprising a screw conveyor, means mounting said conveyor for rotation and for movement across the surface to be plowed sidewise of the conveyor, a housing extending around the rear side of the conveyor, a centrifugal thrower disposed coaxially with and at one end of said conveyor, a casing for the thrower adapted to receive snow from the conveyor, a chute extending upwardly and laterally from said casing, and means for driving said conveyor and thrower, said conveyor including a frusto-conical body mounted for rotation about its longitudinal axis, and a blade extending around the body in a helix, with the pitch of the helix increasing toward the thrower, said helix being of uniform diameter throughout its length and said blade merging into the thrower.

4. A snow-plow comprising a screw conveyor, means mounting said conveyor for rotation and for movement across the surface to be plowed sidewise of the conveyor, a housing extending around the rear side of the conveyor, a centrifugal thrower disposed coaxially with and at one end of said conveyor, a casing for the thrower adapted to receive snow from the conveyor, a chute extending upwardly and laterally from said casing, means for driving said conveyor and thrower, and a liftable cover extending over the front side of the conveyor, said cover being hinged to said housing on an axis above the conveyor, whereby the cover forms a closure with the surface of the snow adapted to confine snow agitated by the conveyor and prevent obstruction of the operator's view.

5. A snow-plow comprising a screw conveyor, means mounting said conveyor for rotation and for movement across the surface to be plowed sidewise of the conveyor, a housing extending around the rear side of the conveyor, a centrifugal thrower disposed coaxially with and at one end of said conveyor, a casing for the thrower adapted to receive snow from said casing, means for driving said conveyor and thrower, a liftable cover extending over the front side of the conveyor, said cover being hinged to said housing on an axis above the conveyor, whereby the cover forms a closure with the surface of the snow adapted to confine snow agitated by the conveyor and prevent obstruction of the operator's view, and a skid supporting the cover and adapted to slide over the surface of the snow.

6. A snow-plow comprising a screw conveyor, means mounting said conveyor for rotation and for movement across the surface to be plowed sidewise of the conveyor, a housing extending around the rear side of the conveyor, a centrifugal thrower disposed coaxially with and at one end of said conveyor, a casing for the thrower adapted to receive snow from the conveyor, a chute extending upwardly and laterally from said casing, means for driving said conveyor and thrower, and a liftable cover extending downwardly in front of said thrower, said cover being hinged to said thrower casing on an axis above the thrower whereby the cover forms a closure with the surface of the snow adapted to confine snow agitated by the conveyor and prevent obstruction of the operator's view.

7. A snow-plow comprising a screw conveyor, means mounting said conveyor for rotation and for movement across the surface to be plowed sidewise of the conveyor, a housing extending around the rear side of the conveyor, a centrifugal thrower disposed coaxially with and at one end of said conveyor, a casing for the thrower adapted to receive snow from the conveyor, a chute extending upwardly and laterally from said casing, means for driving said conveyor and thrower, a liftable cover extending downwardly in front of said thrower, said cover being hinged to said thrower casing on an axis above the thrower whereby the cover forms a closure with the surface of the snow adapted to confine snow agitated by the conveyor and prevent obstruction of the operator's view, and a skid supporting the cover and adapted to slide over the surface of the snow.

8. A snow plow comprising a rotatable screw conveyor arranged transversely of the plow, and a centrifugal thrower arranged in coaxial alignment with said conveyor, said thrower comprising a housing having an inlet opening adjacent the discharge end of the conveyor, and means connected to said conveyor for rotating the same in a direction upwardly at its forward side and downwardly at its rearward side.

9. A snow plow comprising a frame, a centrifugal thrower, a casing for said thrower attached to said frame and having inlet and outlet openings, and a rotary screw conveyor rotatably mounted on said frame and adapted to convey snow to the inlet opening in said casing, said screw conveyor comprising a frusto-conical hub having its end of smaller diameter positioned adjacent said inlet opening, and a helical blade of uniform outer diameter surrounding said hub.

GLEN P. BEVAN.